US007672569B2

United States Patent
Horiuchi et al.

(10) Patent No.: US 7,672,569 B2
(45) Date of Patent: Mar. 2, 2010

(54) MOVING PICTURE RECORDING AND SENDING DEVICE HAVING ZOOM PROCESSING CAPABILITY

(75) Inventors: Tadasu Horiuchi, Yokohama (JP); Ryuji Nishimura, Yokohama (JP); Hironori Komi, Tokyo (JP); Naoki Yamamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1118 days.

(21) Appl. No.: 10/412,332

(22) Filed: Apr. 14, 2003

(65) Prior Publication Data

US 2004/0105653 A1 Jun. 3, 2004

(30) Foreign Application Priority Data

Nov. 28, 2002 (JP) .............................. 2002-344920

(51) Int. Cl.
*H04N 7/00* (2006.01)
*H04N 5/91* (2006.01)
*H04N 5/93* (2006.01)
*G11B 27/00* (2006.01)
*H04N 7/14* (2006.01)
*H04N 5/38* (2006.01)

(52) U.S. Cl. .............................. 386/95; 386/52; 386/46; 348/14.12; 348/723

(58) Field of Classification Search .................... 386/33, 386/1, 98, 108–109, 111–112, 46, 52, 95; 348/14.12, 723

See application file for complete search history.

(56) References Cited

U.S. PATENT DOCUMENTS

| 6,456,321 | B1 * | 9/2002 | Ito et al. ...................... 348/143 |
| 6,943,835 | B2 * | 9/2005 | Okubo .................... 348/240.2 |
| 7,106,364 | B1 * | 9/2006 | Noro et al. ............... 348/211.3 |
| 2001/0033332 | A1 * | 10/2001 | Kato et al. .................. 348/211 |
| 2003/0016944 | A1 * | 1/2003 | Kato ........................... 386/46 |
| 2003/0061621 | A1 * | 3/2003 | Petty et al. .................. 725/105 |

* cited by examiner

*Primary Examiner*—Thai Tran
*Assistant Examiner*—Daquan Zhao
(74) *Attorney, Agent, or Firm*—Antonelli, Terry, Stout & Kraus, LLP.

(57) ABSTRACT

To mix video signals of plural channels in time division and record these video signals onto a recording medium, as well as to select and transmit the video signal of a specific channel to a terminal device at a remote location, there is a video signal switching unit for mixing the video signals of the plural channels in time division; a first video signal compressing unit for compressing the mixed video signals from the video signal switching unit; a unit for recording the video signal compressed by the first video signal compressing unit into the recording medium; second video signal compressing units for selecting a channel from the mixed video signals and compressing the video signals with a compressibility higher than that of the first video signal compressing unit; and a unit for transmitting the video signal compressed by the second video signal compressing unit to a remote location.

3 Claims, 5 Drawing Sheets

MOVING PICTURE RECORDING AND SENDING DEVICE HAVING ZOOM PROCESSING CAPABILITY

BACKGROUND OF THE INVENTION

The present invention relates to a video signal recording and transmitting device for compressing video signals of plural channels that are mixed in time division, recording the video signals onto a recording medium, and compressing the video signals using different compressibilities and transmitting these video signals to an external device.

There is a monitoring system for recording a video signal, that has been produced by a camera located at a monitoring location, onto a recording medium, wherein the video signal is transmitted to a monitoring device from a remote location via a communication network. In such a monitoring system, it is necessary that the video signal to be recorded onto the recording medium is a video signal that is high in resolution and time resolution. However, it is necessary, when transmitting the video signal to a monitoring device at a remote location, to reduce the resolution and the time resolution in accordance with the limit of transmission capacity of the communication network. In a technique related to the conventional monitoring system, the video signal is compressed in plural modes having different compressibilities, and low compression data is recorded onto the recording medium, while high compression data is transmitted. For example, see JP-A-2000-59758.

SUMMARY OF THE INVENTION

In the above-described conventional technique, the video signal produced by a single camera or plural cameras is recorded and monitored by transmitting the video signal to a monitoring device provided at a remote location. However, when plural cameras are employed and the video signal is recorded using one recorder, it is typical to use a system for mixing the video signals of plural channels in time division and recording the video signals onto the recording medium. In such a system, the video signals of the plural channels are mixed in time division and are transmitted, and the video signal of a predetermined desirable channel is selected and monitored by the monitoring device, so that the monitoring operation is performed by the monitoring device at the remote location. Accordingly, in such a system, it is necessary to provide a function for transmitting a video signal, except for the video signal required between the image pickup recorder side and the monitoring device side, and for selecting the video signal of a predetermined desirable channel in the monitoring device.

An object of the present invention is to provide a video signal recording transmitter, a monitoring device and a monitoring system for recording the video signals of plural channels to a recorder in time division, and for transferring only a video signal required in the monitoring operation between the recorder and the monitoring device.

To solve the above-described problems and achieve the above-stated object, the present invention is characterized by the provision of video signal switching means for mixing video signals of plural channels in time division; first video signal compressing means for compressing mixed video signals received from the video signal switching means; means for recording the video signal compressed by the first video signal compressing means onto a recording medium; second video signal compressing means for selecting a channel from the mixed video signals and compressing the video signals with a compressibility higher than that of the first video signal compressing means; and communication means for transmitting the video signal compressed by the second video signal compressing means. The video signal of a specific channel, among the video signals of the plural channels, can be transmitted to the monitoring device at a remote location by such a construction.

BRIEF DESCRIPTION OF THE DRAWING

These and other features, objects and advantages of the present invention will become more apparent from the following description, when taken in conjunction with the accompanying drawings, wherein.

DETAILED DESCRIPTION OF PREFERRED EMBODIMENTS

Figure 1:
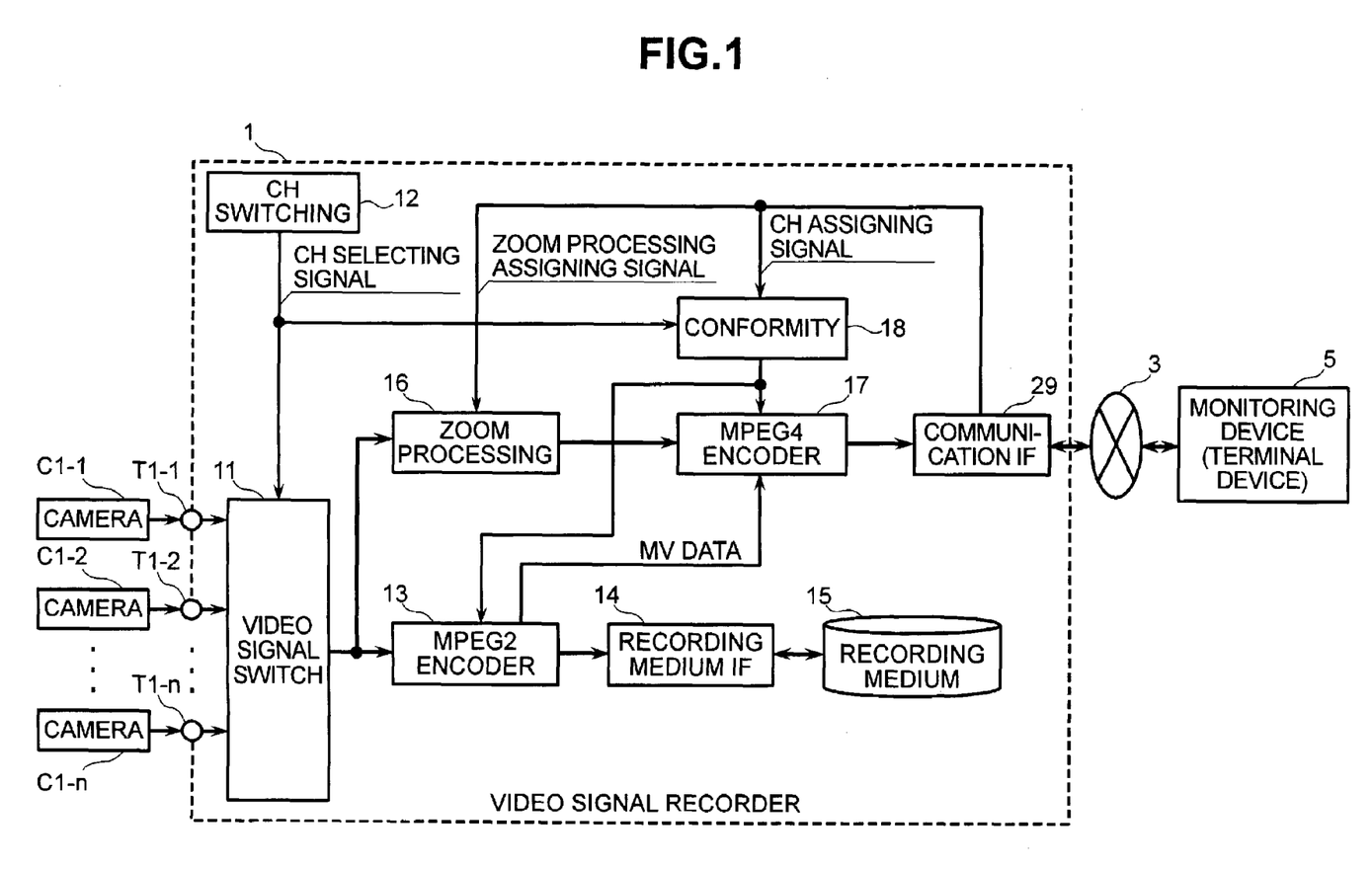
FIG. 1 is a block diagram showing a first embodiment of a remote monitoring system according to the present invention.

A first embodiment of a monitoring system in accordance with the present invention will be explained with reference to FIG. 1. FIG. 1 is a block diagram showing the first embodiment of the monitoring system of the present invention. The monitoring system is formed of a video signal recording transmitter 1, a communication network 3 and a monitoring device (terminal device) 5, which is disposed at a remote location. The video signal recording transmitter 1 is provided with video signal input terminals T1-1, T1-2, T1-$n$ for inputting video signals picked up by plural cameras C1-1, C1-2, C1-$n$; a video signal switch 11 for selecting the video signals of plural channels and outputting the selected video signals as a time division signal; a channel switching circuit 12 for outputting a channel selecting signal to the video signal switch 11; an MPEG2 encoder 13, which serves as a first video signal compressing means; a recording medium interface 14; a recording medium 15, such as a hard disc, etc.; a zoom processing circuit 16; an MPEG4 encoder 17, which serves as a second video signal compressing means; a conformity circuit 18, and a communication interface 29. The video signal recording transmitter 1 and the monitoring device 5 are connected to each other through the communication network 3.

The plural cameras C1-1, C1-2, C1-$n$ serves as means for respectively outputting video signals to the video signal input terminals T1-1, T1-2, T1-$n$.

The video signal switch 11 operates to sequentially select the video signals of the plural channels inputted from the video signal input terminals T1-1, T1-2, T1-$n$, mixes the video signals in time division and outputs the video signals to the MPEG2 encoder 13. It also outputs these video signals to the MPEG4 encoder 17 via the zoom processing circuit 16.

The channel switching circuit 12 operates as a means for controlling the operation of the video signal switch 11, so as to switch the video signals of the plural channels in e.g., a frame unit. Further, the channel switching circuit 12 also outputs the channel selecting signal to the conformity circuit 18.

The MPEG2 encoder 13 constitutes a first video signal compressing means for performing compression-encoding processing with a first compressibility with respect to the inputted video-signal, so as to convert this video signal to a compressed video signal.

The recording medium interface 14 operates to perform writing processing of the compressed video signal so as to record the signals on the recording medium 15. Further, the recording medium interface 14 also operates to perform reading processing of the compressed video signal recorded on the recording medium 15.

For example, the recording medium 15 may be constituted by a hard disc, a DVD and other types of memories, and it is used for storing the compressed video signal, etc. The recording medium 15 itself can be constructed so as to be freely detached from the video signal recording transmitter 1.

The zoom processing circuit 16 is a circuit for performing zoom processing, for cutting and enlarging an arbitrary portion in a frame image of the inputted video signal and for converting the resolution on the basis of a zoom processing assigning signal received from the monitoring device 5 through the communication interface 29.

The MPEG4 encoder 17 constitutes a second video signal compressing means for performing compression-encoding processing with a second compressibility with respect to the video signal of a channel assigned by the channel assigning signal, which is received from the monitoring device 5 through the communication interface 29, so as to convert this encoded video signal to a compressed video signal. Information used in the compression-encoding processing in the MPEG2 encoder 13, e.g., a moving vector (MV), can be used as information to be used in this compression-encoding processing. Thus, it is possible to reduce the amount of processing involved in the compression-encoding processing in the MPEG4 encoder.

The conformity circuit 18 constitutes a means for comparing the channel assigning signal received from the monitoring device 5 through the communication interface 29 and the channel selecting signal received from the channel switching circuit 12, and for judging whether or not both the channel assigning signal and the channel selecting signal conform to each other. When the channel assigning signal and the channel selecting signal conform to each other, the compression-encoding processing in the MPEG4 encoder 17 is performed.

The communication interface 29 is an interface which operates to transmit the compression video signal that has been compressed to a high degree in the MPEG4 encoder 17 to the monitoring device 5 through the communication network 3, and operates to receive a signal, such as the channel assigning signal, a zoom processing assigning signal, etc. from the monitoring device 5 through the communication network 3.

The communication network 3 serves for connecting the video signal recording transmitter 1 and the monitoring device 5, and it transmits signals such as the compression video signal, the channel assigning signal, the zoom processing assigning signal, etc., between the video signal recording transmitter 1 and the monitoring device 5.

The monitoring device 5 operates to extend and decode the compression video signal received from the video signal recording transmitter 1, and it displays the compression video signal on a display screen. The monitoring device 5 also serves for transmitting signals, such as the channel assigning signal for assigning a channel for receiving the transmitted signal, the zoom processing assigning signal for assigning a zoom processing condition as the specification of a cutting area of the image, enlargement processing resolution conversion processing, etc., and others to the video signal recording transmitter 1.

In FIG. 1, the plural cameras C1-1, C1-2, C1-*n* respectively output video signals to the video signal input terminals T1-1, T1-2, T1-*n*. The video signals of the plural channels inputted from the video signal input terminals T1-1, T1-2, T1-*n* are supplied to the video signal switch 11. The channel switching circuit 12 outputs a channel selecting signal so as to switch the video signals of the plural channels in e.g., a frame unit, and controls the operation of the video signal switch 11. Accordingly, in the output of the video signal switch 11, the video signals of the plural channels, that are switched in e.g., a frame unit, are mixed in time division. The output signal from the video signal switch ii is guided to the MPEG2 encoder 13, and it is also supplied to the MPEG4 encoder 17 through the zoom processing circuit 16.

The video signal inputted to the MPEG2 encoder 13 is compressed and encoded in an MPEG2 format for every channel, and it is recorded onto the recording medium 15 as a compression video signal through the recording medium interface 14.

In contrast to this, the compression video signal of an assigned channel that is compressed and encoded by the MPEG4 encoder 17 in an MPEG4 format, having a compressibility higher than that of the MPEG2 format, is applied to the communication interface 29, and it is transmitted to the monitoring device 5, which is disposed at a remote location, via the communication network 3.

The channel assigning signal received by the communication interface 29 from the monitoring device 5 via the communication network 3 is supplied to the conformity circuit 18 and is compared with the channel selecting signal from the channel switching circuit 12. When both the channel assigning signal and the channel selecting signal conform to each other, the MPEG4 encoder 17 compresses and encodes the inputted video signal, and it outputs this compression-encoded video signal as a compressed video signal.

In this embodiment, the video signals produced by the plural cameras C1 and mixed in time division are compressed and encoded and are recorded onto the recording medium 15 in accordance with the above-described operation. Further, the video signal that has been compressed with a high compressibility can be transmitted to the monitoring device 5 at the remote location via the communication network 3. The channel of the compressed video signal that is transmitted to the monitoring device 5 at the remote location can be assigned by the monitoring device 5 from the remote location. Accordingly, a predetermined desirable camera screen image among plural camera screen images can be selected and monitored in the monitoring device 5 at the remote location. Further, in accordance with this embodiment, an enlarged image can be received and a required portion within the monitor screen can be enlarged and monitored by giving instructions to enlarge the required portion of the image of a predetermined channel to a required size, while the images of plural selected channels are sequentially monitored in the monitoring device 5.

Figure 2:
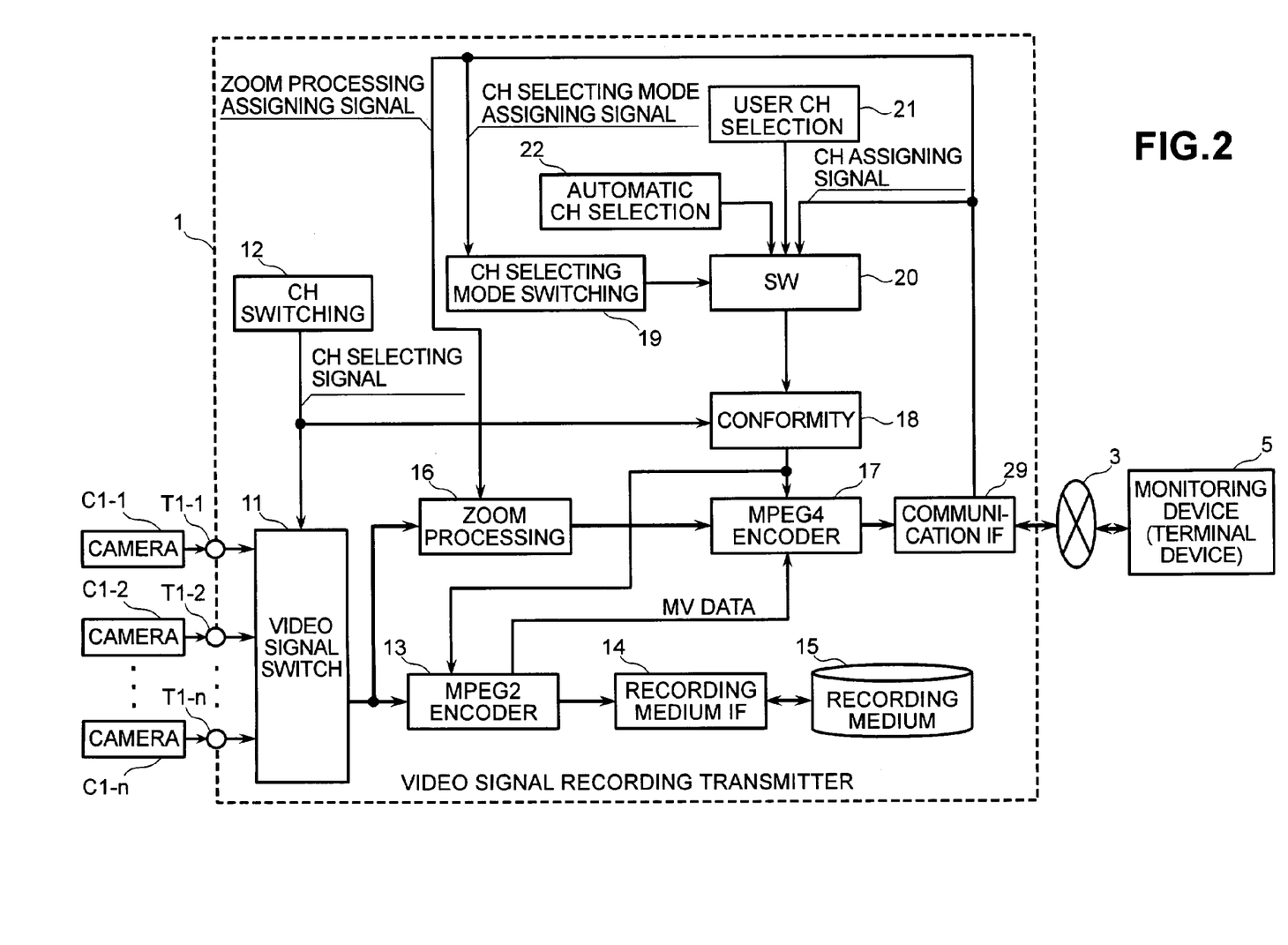
FIG. 2 is a block diagram showing a second embodiment of a remote monitoring system according to the present invention.

A second embodiment of the monitoring system in accordance with the present invention will be explained next with reference to FIG. 2. FIG. 2 is a block diagram showing the second embodiment of the present invention. The monitoring system in this embodiment is characterized in that a channel selecting mode switching circuit 19, a channel selecting mode change-over switch 20, a user channel selecting circuit 21 and an automatic channel selecting circuit 22 are added to the video signal recording transmitter 1 shown in FIG. 1. The same parts as provided in the first embodiment are designated in FIG. 2 by the same reference numerals as used in FIG. 1, and an explanation of the operations of these common parts will be omitted.

The channel selecting mode switching circuit 19 is a circuit for performing switching control so as to select and output one of a channel assigning signal received from the monitoring device 5, a channel assigning signal outputted from the user channel selecting circuit 21, and a channel assigning signal outputted from the automatic channel selecting circuit 22, on the basis of a channel selecting mode assigning signal transmitted by the monitoring device 5 from a remote location and received via the communication network 3. When the channel selecting mode switching circuit 19 receives the channel assigning signal that is transmitted from the remote location, the channel selecting mode switching circuit 19 is operated so as to treat the received channel assigning signal prior to the other two channel selecting signals.

The channel selecting mode change-over switch 20 constitutes a means for selectively switching and outputting the inputted channel assigning signal in response to instructions received from the channel selecting mode switching circuit 19.

The user channel selecting circuit 21 is a circuit for assigning a channel to be transmitted to the monitoring device 5 at the remote location by a user of this video signal recording transmitter in its arranging place, and this user channel selecting circuit 21 outputs the channel assigning signal corresponding to the channel set by the user.

The automatic channel selecting circuit 22 is a circuit for automatically switching and selecting the channel of the video signal to be transmitted to the monitoring device 5 at the remote location. The automatic channel selecting circuit 22 outputs the corresponding channel assigning signal so as to sequentially switch the channel of the video signal at a predetermined time interval, e.g., an interval of several seconds.

The first embodiment, as already described, is constructed such that the channel of the video signal that is compressed and encoded by the MPEG4 encoder 17 and transmitted by the communication interface 29 is assigned from the external monitoring device 5 via the communication network 3. However, in this second embodiment, another channel assigning method can be also performed.

In this second embodiment, while the video signals of all the channels are normally sequentially switched as indicated by the above-described operation at an interval of e.g., several seconds, the video signals are transmitted to the monitoring device 5 at the remote location (in an automatic channel selecting mode), or the video signal of a specific fixed channel that is assigned by the user of the video signal recording transmitter is transmitted to the monitoring device 5 at the remote location (in a user channel selecting mode). When there is a channel assignment by the monitoring device 5 from the remote location, the video signal of the assigned channel can be transmitted to the monitoring device 5 at the remote location (in a monitoring device channel selecting mode).

Figure 3:
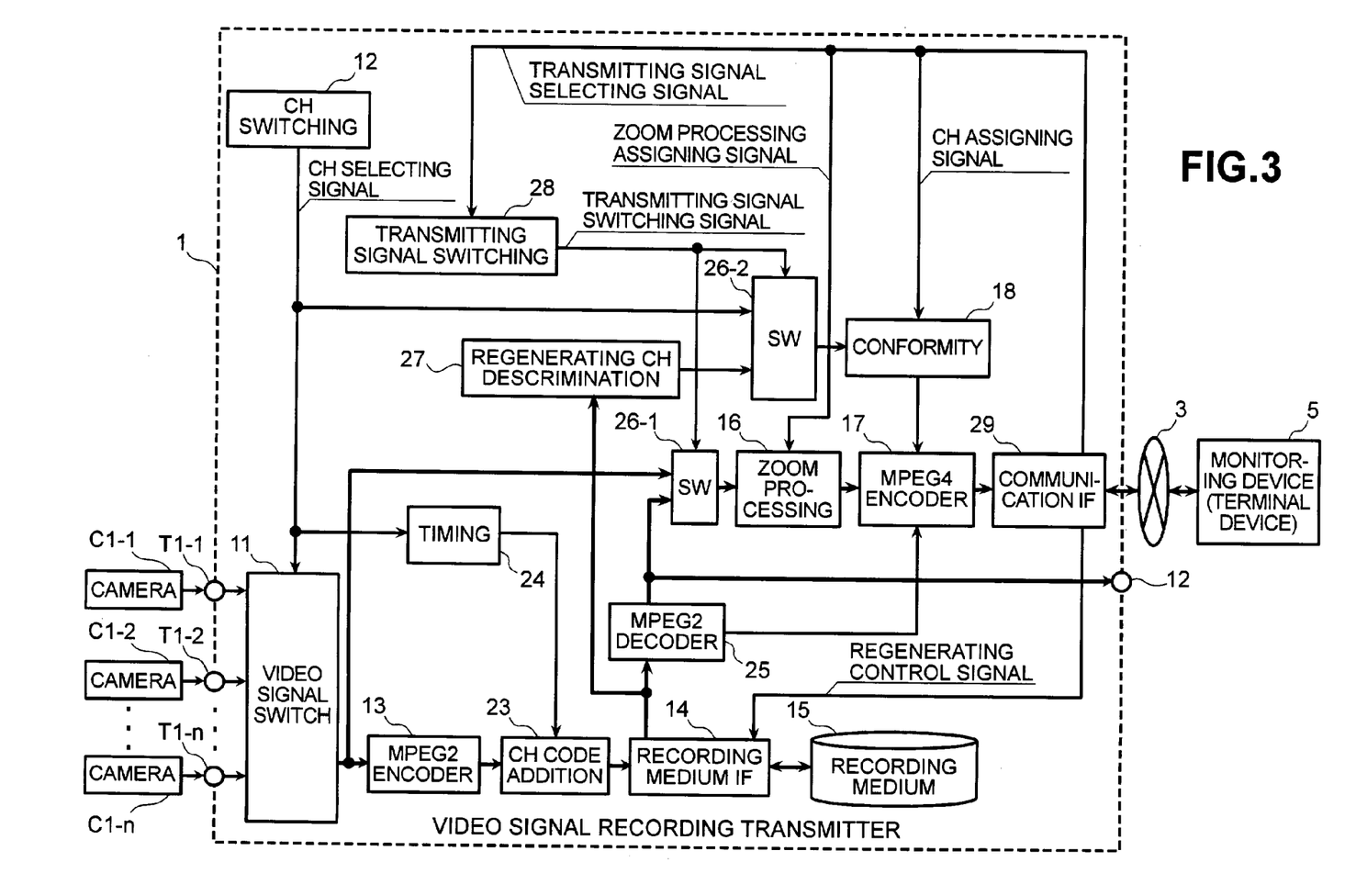
FIG. 3 is a block diagram showing a third embodiment of a remote monitoring system according to the present invention.

A third embodiment of the monitoring system in accordance with the present invention will be explained next with reference to FIG. 3. FIG. 3 is a block diagram showing the third embodiment of the monitoring system of the present invention. This embodiment is characterized in that a channel code adding circuit 23, a timing adjusting circuit 24, an MPEG2 decoder 25, an input selecting switch 26-1, a channel signal selecting switch 26-2, a regenerating channel discriminating circuit 27, a transmitting signal switching circuit 28 and a video signal output terminal T2 are added to the video signal recording transmitter 1 of the first embodiment shown in FIG. 1. The same parts as provided in the first embodiment are designated in FIG. 3 by the same reference numerals as used in FIG. 1, and an explanation of the operations of these common parts will be omitted.

Namely, the third embodiment is constructed such that a regenerating function is provided for the recording medium 15, and a required channel video signal can be received as a compression video signal from the video signal recording transmitter 1 by operating the recording medium 15 from the monitoring device 5, in addition to the features of the first embodiment.

The channel code adding circuit 23 is a circuit for adding a channel code, indicating the channel of the video signal selected by the channel switching circuit 12, to the video signal compressed and encoded by the MPEG2 encoder 13.

The timing adjusting circuit 24 is a delay circuit corresponding to the time required to perform the compression-encoding processing of the video signal in the MPEG2 encoder 13. This timing adjusting circuit 24 is used for inputting the channel selecting signal from the channel switching circuit 12 to the channel code adding circuit 23 by conforming the timings of the compression video signal that is processed in the MPEG2 encoder 13 and the channel code to each other.

The MPEG2 decoder 25 is a circuit for extending and decoding the compression video signal of an MPEG2 format, that is read from the recording medium 15 via the recording medium interface 14, to the original video signal, and for converting the compression video signal to a decoded video signal. The decoded video signal is outputted to the MPEG4 encoder 17 and the regenerating channel discriminating circuit 27 through the video signal output terminal T2, the input selecting switch 26-1 and the zoom processing circuit 16.

The input selecting switch 26-1 is a circuit for selecting one of the video signal received from the video signal switch 11 and the video signal that is regenerated from the recording medium 15 and extended and decoded by the MPEG2 decoder, on the basis of a transmitting signal switching signal received from the transmitting signal switching circuit 28, and for outputting the selected video signal to the zoom processing circuit 16.

The channel signal selecting switch 26-2 is a circuit for selecting one of the channel selecting signal received from the channel switching circuit 12 and the channel code added to the compression video signal that is regenerated from the recording medium 15 and discriminated in the regenerating channel discriminating circuit 27, on the basis of the transmitting signal switching signal received from the transmitting signal switching circuit 28. The selected channel selecting signal or channel code is outputted to the conformity circuit 18.

The regenerating channel discriminating circuit 27 is a circuit for reading the channel code that is added to a regenerating compression video signal read from the recording medium 15, for discriminating the channel during the regeneration, and for outputting the channel code. The channel code is outputted to the conformity circuit 18 through the channel signal selecting switch 26-2.

The transmitting signal switching circuit 28 is a circuit for giving instructions for selecting one of the video signal picked up by a camera and the video signal obtained by regenerating, extending and decoding the video signal once recorded onto the recording medium 15. The transmitting signal switching circuit 28 outputs the transmitting signal switching signal on the basis of a transmitting signal selecting signal received from the monitoring device 5.

The video signal output terminal T2 is a terminal for outputting the video signal obtained by extending and decoding the compression video signal that is recorded on to the recording medium 15.

The monitoring device 5 at a remote location outputs the transmitting signal selecting signal and a regenerating control signal, which is used for controlling whether the video signal is regenerated in a specified position of the recording medium 15, to the communication interface 29 via the communication network 3. The transmitting signal selecting signal indicates whether the video signal in real time produced by the camera is transmitted to the monitoring device 5 at the remote location, or whether the past video signal that is regenerated from the recording medium 15 is transmitted to the monitoring device 5 at the remote location.

The communication interface 29 outputs the received transmitting signal selecting signal to the transmitting signal switching circuit 28. The transmitting signal switching circuit 28 controls the operations of the input selecting switch 26-1 and the channel signal selecting switch 26-2 in accordance with this transmitting signal selecting signal. The communication interface 29 also outputs the received regenerating control signal to the recording medium interface 14. The recording medium interface 14 controls a regenerating operation of the recording medium 15 in accordance with this regenerating control signal.

At a recording time, the channel selecting signal received from the channel switching circuit 12 is inputted to the channel code adding circuit 23 through the timing adjusting circuit 24. The channel code adding circuit 23 adds the channel code indicating the channel of the video signal selected by the channel switching circuit 12 to the compression video signal that is compressed and encoded by the MPEG2 encoder 13. The compression video signal with the channel code appended thereto is recorded onto the recording medium 15 through the recording medium interface 14.

In contrast to this, at a regenerating time, the compression video signal that is regenerated from the recording medium 15 is inputted to the MPEG2 decoder 25 through the recording medium interface 14. The MPEG2 decoder 25 extends and decodes the inputted compression video signal of the MPEG2 format to obtain the original video signal, and it outputs this original video signal to the video signal output terminal T2, and to the MPEG4 encoder 17 through the input selecting switch 26-1 and the zoom processing circuit 16.

The compression video signal having the channel code regenerated from the recording medium 15 appended thereto is inputted to the regenerating channel discriminating circuit 27 through the recording medium interface 14. The regenerating channel discriminating circuit 27 reads the channel code appended to the inputted compression video signal, discriminates the channel during the regeneration, and outputs this channel to the conformity circuit 18 through the channel signal selecting switch 26-2.

Similar to the first embodiment, the operation of the MPEG4 encoder 17 is controlled to perform compression-encoding processing when the discriminated regenerating channel and the channel assigned by the monitoring device 5 at the remote location conform to each other.

In this embodiment, it is possible to select which one of the video signal in real time produced by the camera and the past video signal regenerated from the recording medium 15 is to be sent to the monitoring device 5 at the remote location by the above-described operation, from the monitoring device 5 at the remote location. Further, it is possible to select whether the video signal in a selected position of the recording medium is regenerated and which channel of the regenerated video signal is transmitted to the monitoring device 5 at the remote location, from the monitoring device 5 at the remote location.

Figure 4:
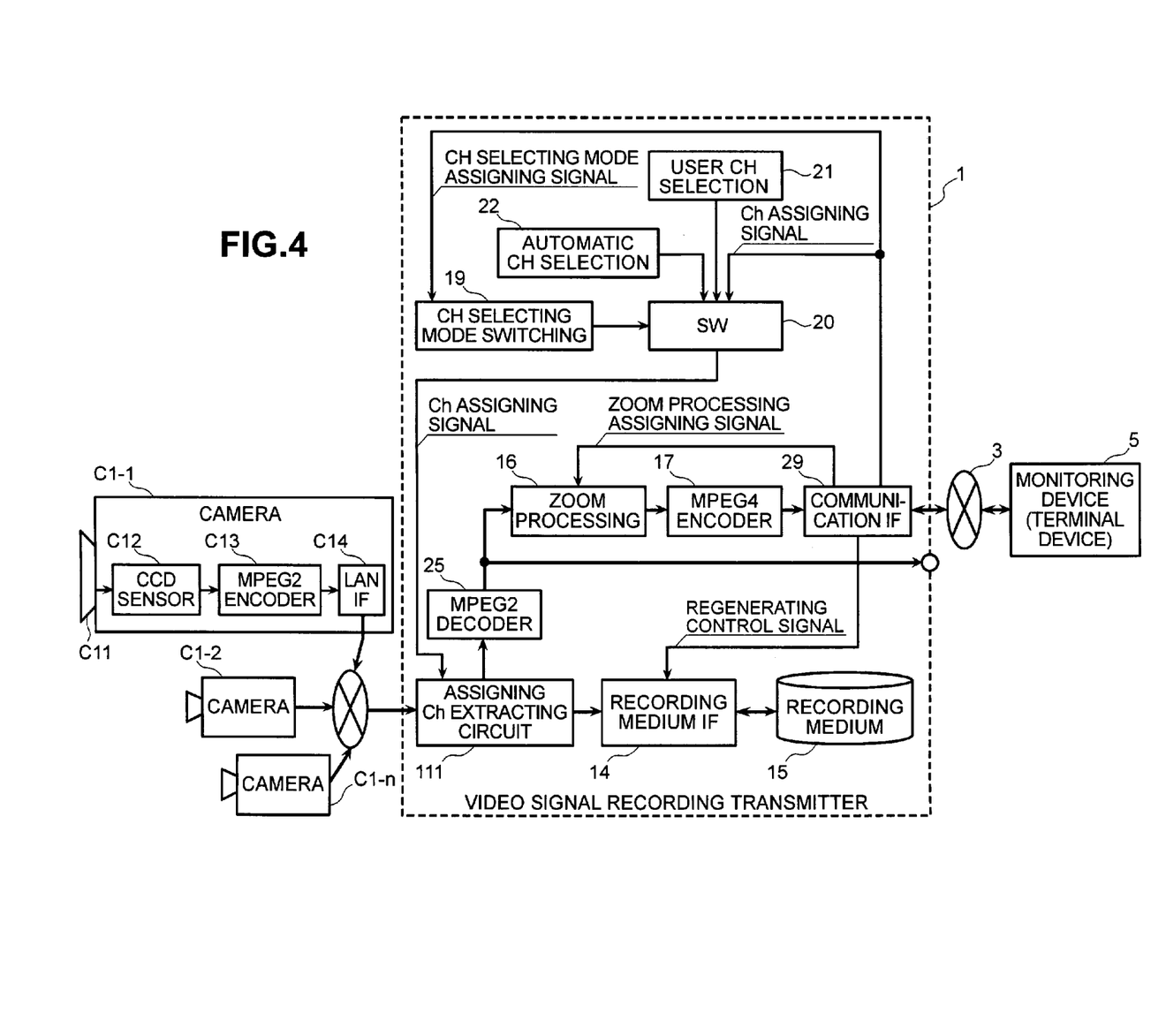
FIG. 4 is a block diagram showing a fourth embodiment of a remote monitoring system according to the present invention.

A fourth embodiment of the monitoring system in accordance with the present invention will be explained next with reference to FIG. 4. FIG. 4 is a block diagram showing the fourth embodiment of the monitoring system of the present invention. This embodiment represents a system in which a signal from a monitoring camera Cl, that is inputted to the video signal recording transmitter 1 in the second embodiment shown in FIG. 2, is set to a signal obtained by the MPEG2 compression processing. In this embodiment, a camera device C1 is constructed so as to have a lens C11, an image sensor C12, an MPEG2 encoder C13 and a LAN interface C14. Plural camera devices C1-1, C1-2, C1-n are respectively connected to the video signal recording transmitter 1 through a local area network (LAN) 7.

The video signal recording transmitter 1 is characterized in that the video signal switch 11 in the video signal recording transmitter 1 shown in FIG. 2, the channel switching circuit 12 for outputting the channel selecting signal in the video signal switch 11, and the MPEG2 encoder 13 serving as a first video signal compressing means are omitted, and an MPEG2 decoder 25 and a video signal output terminal T2 are added. The same parts as provided in the first, second and third embodiments are designated in FIG. 4 by the same reference numerals as used FIGS. 1, 2 and 3, and an explanation of operations of these common parts will be omitted.

Namely, in the fourth embodiment, in addition to the second embodiment, the MPEG2 encoder C13 and the LAN interface C14 are arranged within the camera device C1, and the MPEG2 decoder 25 and an assigning channel extracting circuit 111 are arranged in the video signal recording transmitter 1, and the video signal of an assigning channel from the camera device C1 is decoded and extended and can be outputted from the output terminal T2.

The camera devices C1-1 to C1-n are respectively arranged at separate locations, and they are connected to each other by the LAN 7. In each of the camera devices C1-1 to C1-n, the video signal that is picked up through the lens C11 and the image sensor C12, such as a CCD sensor, etc., is compressed and encoded in the MPEG2 format by the MPEG2 encoder C13 and is changed to a packet, and it is then recorded to the recording medium 15 of the video signal recording transmitter 1 through the LAN interface C14 via the LAN 7. The video signal from each of the camera devices C1-1 to C1-n is recorded onto the recording medium 15 in time division.

The assigning channel extracting circuit 111 selects only the packet of an assigned channel among the packets of the MPEG2 format sent from the camera device C1 via the LAN 7, and it sends this packet to the MPEG2 decoder 25, where this packet is decoded. After a predetermined portion of the image is selected and is enlarged and processed in the zoom processing circuit 16, the predetermined portion is compressed in the MPEG4 format in the MPEG4 encoder 17, and it is transmitted to the monitoring device 5 at the remote location through the communication interface 29 via the communication network 3.

The video signal regenerated from the recording medium 15 and compressed in the MPEG2 format is sent to the assigning channel extracting circuit 111. Only the packet of the assigned channel is then selected among the regenerated packets of the MPEG2 format. Similar to the recording, the selected packet is next sent to the monitoring device 5 via the communication network 3.

In this embodiment, the video signal obtained by performing zoom processing with respect to the image obtained by selecting a predetermined camera or channel from screen images received from the plural cameras or the video signals of plural channels regenerated from the recording medium can be sent to the monitoring device 5 at the remote location by the above-described operation.

Figure 5:
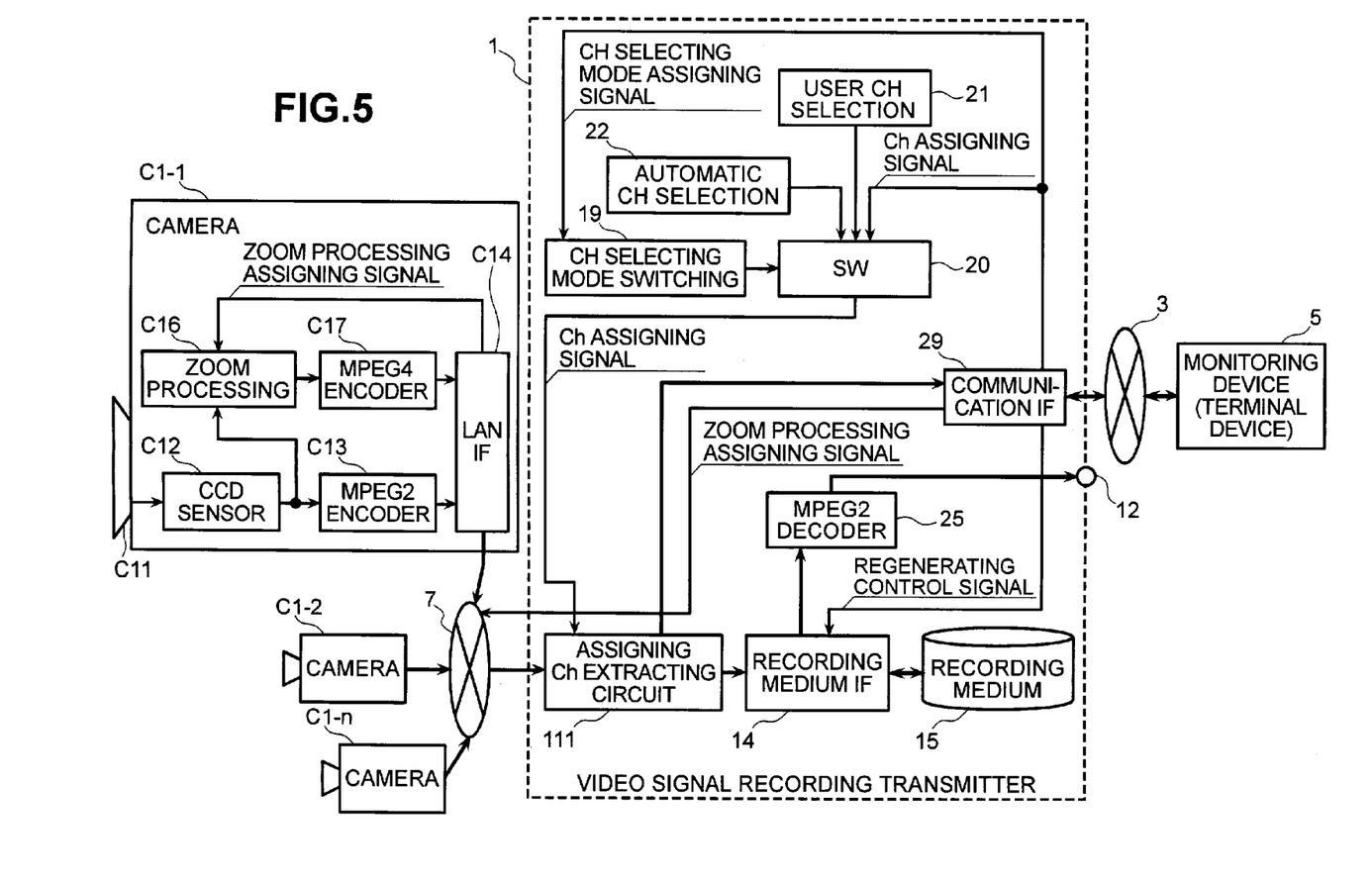
FIG. 5 is a block diagram showing a fifth embodiment of a remote monitoring system according to the present invention.

A fifth embodiment of the monitoring system in accordance with the present invention will be explained next with reference to FIG. 4. FIG. 5 is a block diagram showing the fifth embodiment of the monitoring system of the present invention. This embodiment is characterized in that a zoom processing circuit 15 and an MPEG4 encoder C17 are additionally provided in the monitor camera Cl that is connected to the video signal recording transmitter 1 in the fourth embodiment shown in FIG. 4, and the zoom processing circuit 16 and the MPEG4 encoder 17 are eliminated from the video signal recording transmitter 1. The same parts as provided in the fourth are designated in FIG. 5 by the same reference numerals as used in FIG. 4, and an explanation of the operations of these common parts will be omitted.

Namely, this embodiment is characterized in that an MPEG4 encoder function and a zoom processing function are provided in the camera device C1. The camera devices C1-1, C1-2, C1-n are respectively arranged in separate locations, and they are connected to each other by the LAN 7. In each of the camera devices C1-1, C1-2, C1-n, similar to the fourth embodiment, the video signal that is picked up through the lens C11 and the image sensor C12 is compressed and encoded in the MPEG2 format in the MPEG2 encoder C13, and it is changed to a packet. Thereafter, the video signal is recorded onto the recording medium 15 of the video signal recording transmitter 1 through the LAN interface C14 via the LAN 7. The video signal from each of the camera devices C1-1, C1-2, C1-n is recorded in time division.

The camera devices C1-1 to C1-n of this embodiment have a function for performing zoom processing with respect to the picked-up video signal in the zoom processing circuit C16 in accordance with a zoom processing assigning signal received from the monitoring device 5 via the LAN 7. The video signal is then compressed and encoded in the MPEG4 format in the MPEG4 encoder C17, and the encoded signal to the LAN 7 through the LAN interface C14.

An operator at the monitoring device 5 at the remote location assigns the channel of a camera device that is to perform the zoom processing from the monitoring device 5, while the operator sequentially monitors the video signal sent from the video signal recording transmitter 1. The zoom processing assigning signal that is transmitted from the monitoring device 5 is received by the communication interface 29 of the video signal recording transmitter 1 via the communication network 3 in accordance with this assignment by the operator, and it is sent to the zoom processing circuit C16 through the LAN interface C14 of the assigned camera device C1 via the LAN 7.

The assigned camera device C1 performs the zoom processing of a predetermined portion of the video signal picked-up in accordance with this zoom processing assigning signal, and then the predetermined portion is compressed and encoded in the MPEG4 format, and the encoded portion is output to the LAN interface C14.

In this embodiment, a signal obtained by selecting a camera and performing the zoom processing from the video signals received from the plural camera devices can be sent to the monitoring device at the remote location in accordance with the above-described operation.

In the first, second and third embodiments of the present invention, the transmitted video signal is compressed and encoded in the MPEG4 format, but the output of the MPEG2 encoder 13 may be also converted to the MPEG4 format. In this case, a converting means for converting the output from the MPEG2 format to the MPEG4 format is provided instead of the MPEG4 decoder 17. When the video signal in real time produced by a camera is transmitted to the monitoring device 5 at the remote location, the output of the MPEG2 encoder 13 is converted to the MPEG4 format. When the past video signal that has been recorded onto the recording medium 15 is transmitted to the monitoring device 5 at the remote location, a regenerated video signal from the recording medium interface 14 is converted to the MPEG4 format.

Further, in the first, second and third embodiments of the present invention, the compression system is set to the MPEG2 format and the MPEG4 format. However, another compression system may be also used, if the compressibility of the video signal that is transmitted to the monitoring device 5 at the remote location is higher than the compressibility of the video signal that is recorded onto the recording medium 15, and it is in conformity with the limit of the transmission capacity of the communication network 3.

In accordance with the present invention, the video signals produced by plural cameras and mixed in time division are compressed and recorded onto a recording medium. Further, the video signal that is compressed with a high compressibility can be transmitted to the monitoring device at the remote location via the communication network, and the channel of the video signal that is transmitted to the monitoring device at the remote location can be assigned from the monitoring device itself. Accordingly, a predetermined desirable camera screen image, among the plural camera screen images, can be selected and monitored in the monitoring device at the remote location.

While we have shown and described several embodiments in accordance with our invention, it should be understood that the disclosed embodiments are susceptible of changes and modifications without departing from the scope of the invention. Therefor, we do not intend to be bound by the details shown and described herein, but intend to cover all such changes and modifications as fall within the ambit of the appended claims.

We claim:

1. A video signal recording transmitter comprising:

an input unit for inputting video signals of plural channels;

a video signal input switching unit for switching and outputting the video signals of said plural channels in time division;

a first video signal compressing unit for compressing an output from the video signal input switching unit;

a recording unit for recording an output signal from the first video signal compressing unit to a recording medium;

a second video signal compressing unit for compressing an output from said video signal input switching unit with a high compressibility in comparison with said first video signal compressing unit;

a communication unit for transmitting an output signal from the second video signal compressing unit to another device;

a channel selecting control unit for controlling the operation of said second video signal compressing unit so as to selectively compress a specific channel included in the output of said video signal input switching unit;

a unit for receiving a zoom processing assigning signal from a monitoring device; and a zoom processing circuit for enlarging and processing a predetermined portion of an image in accordance with the zoom processing assigning signal, wherein the video signal which is input to the second video signal compressing unit is input to the second video signal compressing unit after going through the zoom processing unit, and the video signal which is input to the first video signal compressing unit is input to the first video signal compressing unit directly, wherein the second video signal compressing unit processing is performed after the predetermined portion of the image is enlarged and processed on the basis of the zoom processing assigning signal; and wherein video signals for zoom processing are automatically selected and processed by the zoom processing circuit without user input.

2. A monitoring system for connecting plural camera devices and a video signal recording transmitter through a LAN, and connecting this video signal recording transmitter and a monitoring device provided at a remote location through a communication unit, and characterized in that said camera devices have a first video signal compressing unit for compressing an image pickup signal and a LAN interface, and said video signal recording transmitter has:

an assigning channel extracting circuit for switching and outputting video signal inputs from said plural camera devices in time division, and for extracting a channel assigned on the basis of a channel assigning signal received from said monitoring device;

a video signal decoding unit for decoding a compression video signal of an assigned channel received from the assigning channel extracting circuit;

a recording unit for recording the video signal switched and outputted from said assigning channel extracting circuit in time division to a recording medium;

a second video signal compressing unit for compressing an output from said video signal decoding unit with a high compressibility in comparison with said first video signal compressing unit;

a communication unit for transmitting an output signal from the second video signal compressing unit to another device;

a unit for receiving a zoom processing assigning signal from a monitoring device; and a zoom processing circuit for enlarging and processing a predetermined portion of an image in accordance with the zoom processing assigning signal, wherein the video signal which is input to the second video signal compressing unit is input to the second video signal compressing unit after going through the zoom processing unit, and the video signal which is input to the first video signal compressing unit is input to the first video signal compressing unit directly, wherein the second video signal compressing unit processing is performed after the predetermined portion of the image is enlarged and processed on the basis of the zoom processing assigning signal; and wherein video signals for zoom processing are automatically selected and processed by the zoom processing circuit without user input.

3. A monitoring system for connecting plural camera devices and a video signal recording transmitter through a LAN, and for connecting this video signal recording transmitter and a monitoring device provided at a remote location through a communication unit, and characterized in that said camera devices have a first video signal compressing unit for compressing an image pickup signal to provide a first compressed video signal, a second video signal compressing unit for compressing said image pickup signal with a high compressibility in comparison with said first video signal compressing unit to provide a second compressed video signal, and a LAN interface, and said video signal recording transmitter has:

an assigning channel extracting circuit for switching and outputting video signal inputs from said plural camera devices in time division, and for extracting a channel assigned on the basis of a channel assigning signal received from said monitoring device;

a recording unit for recording the video signal switched and outputted from said assigning channel extracting circuit in time division to a recording medium;

a communication unit for transmitting a second compressed video signal, which is compressed with a high compressibility in comparison with said first compressed video signal, from said camera device to another device;

a unit for receiving a zoom processing assigning signal from a monitoring device; and a zoom processing circuit for enlarging and processing a predetermined portion of an image in accordance with the zoom processing assigning signal, wherein the video signal which is input to the second video signal compressing unit is input to the second video signal compressing unit after going through the zoom processing unit, and the video signal which is input to the first video signal compressing unit is input to the first video signal compressing unit directly, wherein the second video signal compressing unit processing is performed after the predetermined portion of the image is enlarged and processed on the basis of the zoom processing assigning signal; and wherein video signals for zoom processing are automatically selected and processed by the zoom processing circuit without user input.

* * * * *